Aug. 1, 1961  R. A. HEROLD  2,994,728
ALKALINE STORAGE BATTERIES
Filed Feb. 17, 1958  2 Sheets-Sheet 1

INVENTOR
Rodolphe André Herold
BY
Kenyon Kenyon
ATTORNEYS

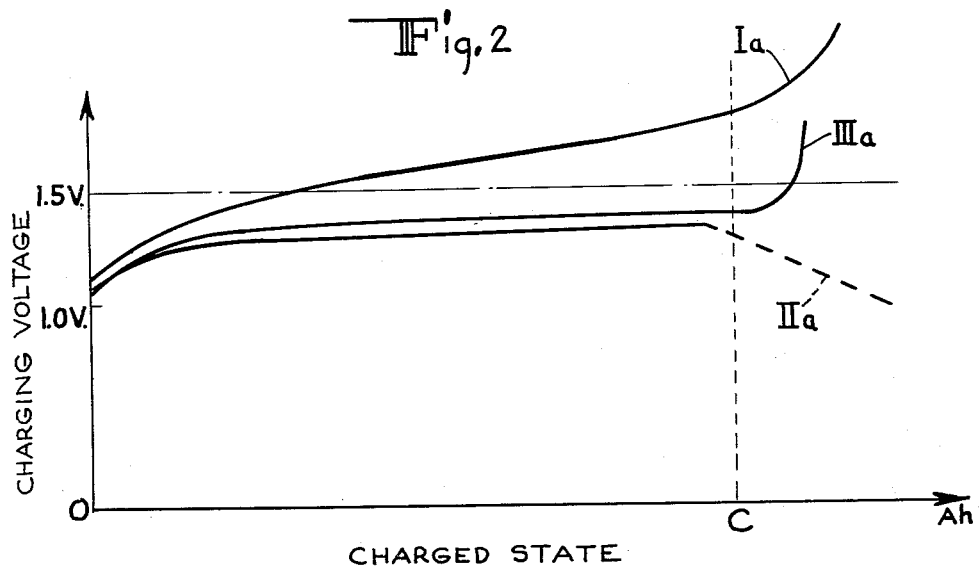
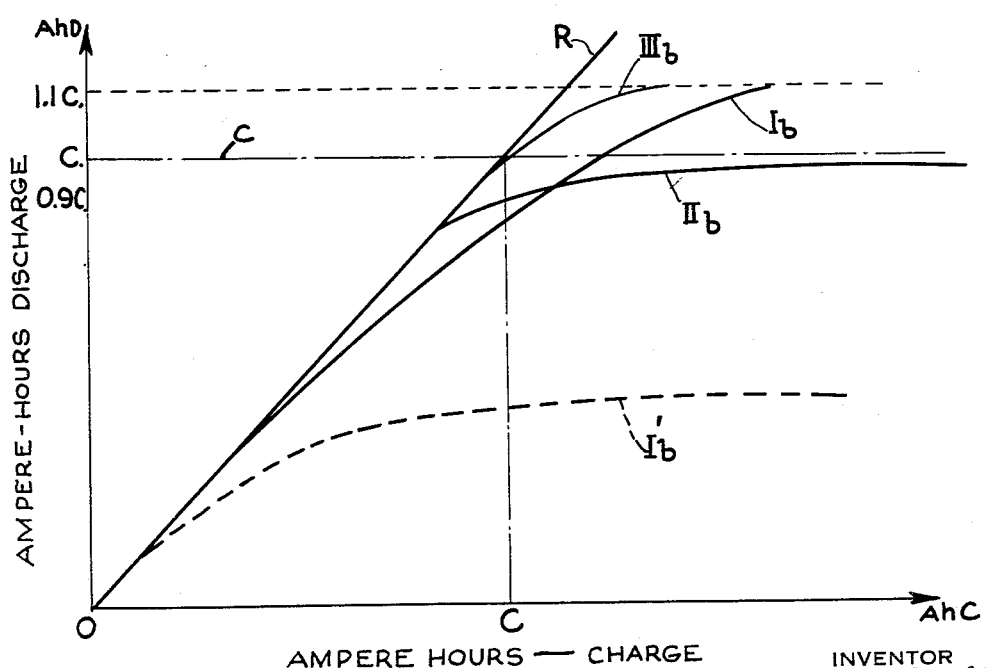

United States Patent Office 2,994,728
Patented Aug. 1, 1961

2,994,728
ALKALINE STORAGE BATTERIES
Rodolphe André Herold, Boulogne-Billancourt, France, assignor to Societe des Accumulateurs Fixes et de Traction (Society Anonyme) Romainville, France, a company of France
Filed Feb. 17, 1958, Ser. No. 715,685
Claims priority, application France Feb. 20, 1957
6 Claims. (Cl. 136—9)

This invention relates to alkaline storage batteries and more particularly to sealed batteries of this type.

Jeannin U.S. Patent 2,646,455, dated July 21, 1953, has already disclosed electrolytic cells and particularly storage batteries which evolve practically no gas and accordingly may remain permanently closed in a gas-tight manner, without substantially increasing their internal pressure.

The electrolytic cells of said patent comprises separators between electrodes, at least the surface of said electrodes being microporous, said separators being thin, practically homogeneous, able to retain the electrolyte and in close engagement with the opposite faces of the said electrodes. In the said patent it has been proposed in particular to obtain the said close engagement by energetically compressing the stack of electrode plates and separators and by maintaining the said stack under pressure while in use.

A U.S. application Serial No. 653,314, filed April 17, 1957, now Patent No. 2,930,829, by Pierre A. C. Jacquier, entitled "Gas-Tight Electrolytic Cells and Gas-Tight Storage Cells," discloses a way of obtaining the close engagement between the separator and electrodes by using as separators reticulated structures of highly absorbent elements, said elements being capable of swelling when wet, said structures being placed when in the dry state between the said electrodes (which external means prevent from moving apart) and then being saturated with electrolyte.

The said highly absorbent structures as described in said application are preferably made of long cellulosic fibers disposed in a layer, said fibers having a substantially parallel direction and being linked together also by a cellulosic binder.

The said Jacquier patent application has also disclosed means for reinforcing the reticulated structure thus realized by a physically stronger structure, preferably constituted by synthetic resin fibers which may either be mixed with the absorbent fibers, or form layers distinct from the said absorbent fibers, the separator still remaining homogeneous as to their permeability.

Thus, the said Jacquier application discloses a storage battery without gaseous evolution, which accordingly may remain permanently closed or sealed without evolving internal pressure.

However, the sealed batteries thus realized, i.e. either according to the said Jeannin Patent 2,646,455 or according to the above-mentioned Jacquier patent application, are found to remain at a low voltage at the end of the charge, and to heat up during an overcharge, due to the fact that, the gaseous evolution being prevented, the power absorbed by such batteries is then completely changed into heat.

This brings up difficult problems for the control of the charge, for the increase of the voltage at the terminals of the storage battery cannot then be used for the control of the charging circuit. Accordingly it is necessary to make use of the only apparent phenomenon at the end of the charge, namely, the increase of temperature, and thus to achieve the regulation through means sensitive to this increase of temperature. Such charging control means are not rugged and are easily liable to be put out of order.

It is well known, on the other hand, that the conventional unsealed alkaline cells, on the contrary, have a rather unsteady charging voltage, even before the end of the charge, since a gaseous evolution takes place even before the cell is half-charged. In such a case, too, the control of the charge is rather difficult for, if there actually is at the end of the charge an increase of the voltage more marked then during the charge, this increase of the voltage is progressive and the moment when it begins is rather indefinite.

Principal objects and features of the present invention are the provision of a storage cell showing no gaseous evolution until towards the end of the charge, but on the contrary showing a gaseous evolution at the end of the charge, said evolution, by suddenly polarizing the electrodes, giving rise to a sharp increase of the voltage which is easy to use for controlling the said charge.

The storage cell according to this invention comprises finely porous parallel plates, each made of a support carrying agglomerated metal particles, impregnated with respectively positive and negative active material, separators being arranged between the plates, said separators comprising, cross-sectionally, a middle layer of a very low permeability and on each side of said middle layer a more highly permeable outer layer, each of the said outer layers having a surface area at least as large as that of the plates, being homogeneous as well on the surface as on its whole depth, and the outer sides of the said separators closely engaging the faces of the opposite plates.

Preferably, the said layers have the structure of gels possessing different permeabilities, the middle layer being a semi-permeable gel or a gel only permeable to ions.

The aforementioned close engagement between the plates and separators may be obtained, as in the Jeannin Patent No. 2,646,455 by highly compressing the stack of plates and separators; it may be obtained, as in the already mentioned Jacquier application by using separators having at least one layer able to swell when impregnated with electrolyte, and by arranging such a separator while in the dry state between the plates, said plates being prevented from moving apart by external means, and then by impregnating the stack of plates and separators with electrolyte.

In an advantageous embodiment of the present invention, the middle layer of the separator is a semi-permeable membrane, e.g. a regenerated cellulose sheet, whereas the outer layers comprise non-woven fabrics, i.e. layers of long fibers united by a binder. In order to be able to swell, one at least of these layers is made of cellulose (fibers and binder). Preferably, one of the outer layers and advantageously the layer which is in contact with the positive plate, is made of a cellulosic nonwoven fabric, and the other outer layer, which engages the opposite negative plate, is a nonwoven fabric made of synthetic resin substantially unaltered by the electrolyte.

It has been shown by experiment that a cell thus realized evolves no gas during the charge, but on the other hand, and surprisingly after the completion of the charge, the gaseous evolution is high and practically in agreement with Faraday's laws.

The discussion of the experimental charging curves available and embodied herein which hereinafter is presented in detail, may give an explanation of this surprising phenomenon. However, the operativeness of the cells or batteries embodying the invention and their value are not in any case to be construed as depending upon the correctness of this explanation.

It is to be noted that arranging a thin membrane in the body of a separator, and more especially a cellulosic membrane, and particularly of providing separators comprising three side by side sheets, the middle sheet being a regenerated cellulose membrane, is well known per se. Examples are the French Patents 745,995, filed on February 5, 1932, and 1,027,561, filed November 10, 1950. However, in these French patents, the structures associated with the cellulosic sheet do not have a homogeneous permeability and moreover they do not closely engage the opposite electrodes; and lastly, the electrodes of said French patents are not microporous, so that the storage cells equipped or provided with such already known separators are not different in operation from conventional cells.

Further objects and features of this invention are the provision of simple economical structure for batteries and cells embodying the desirable attributes hereinabove discussed.

Other objects and features will become apparent from the following description and the accompanying drawings, wherein:

FIGURES 2 and 3 depict curves plotted to different ordinates and abscissae for the purposes of providing a comparison of the functioning of the storage cell according to the invention with conventional storage cells and with storage cells without gaseous evolution which are described, for example, in the hereinabove mentioned Jeannin patent and Jacquier application.

Figure 1:
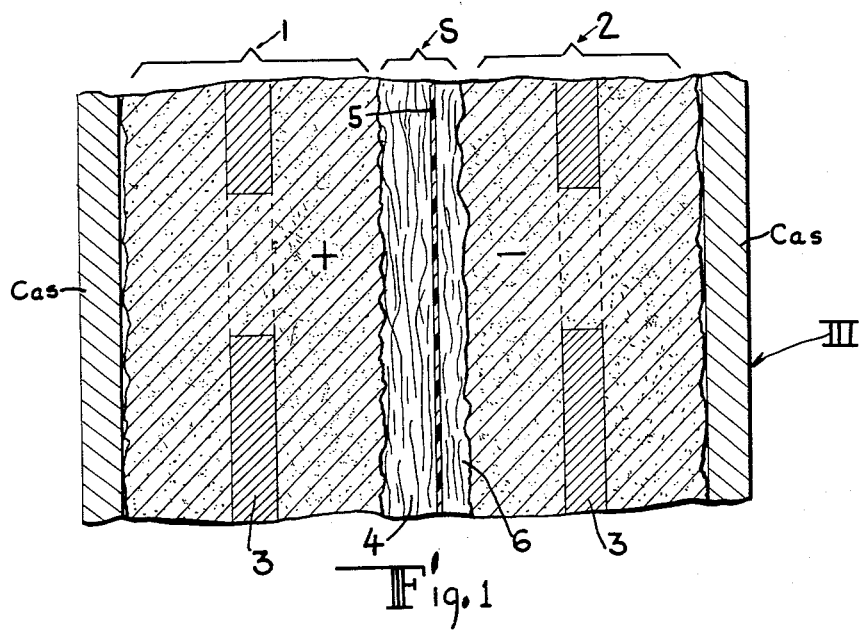
FIGURE 1 is a fragmentary cross-section on an exaggerated scale of two cell electrodes of opposite polarities in a casing, with a separator between them.

On the cross-section of FIGURE 1 which corresponds to an enlargement of fifty to sixty times the real size, the electrodes 1 and 2 are thin plates essentially made of thin perforated metal sheets 3 coated on both sides with layers of metal particles, e.g. nickel, compacted as by sintering.

Such plates are less than one millimeter thick; they are impregnated by nickel hydroxide mixed or not with cobalt hydroxide for the positive plates 1, and by cadmium hydroxide for the negative plates 2.

A separator composed of three side by side sheets 4, 5 and 6 is positioned between the said electrode plates 1 and 2.

Sheet 4 of the separator S in contact with the positive electrode 1 is composed preferably of cellulosic fibers arranged in a layer and agglomerated by a cellulosic binder. Such a sheet is known as non-woven fabric. Its thickness when dry lies in the range of approximately 0.15 to 0.20 mm.

Sheet 5 is a continuous membrane which may be made e.g. of regenerated cellulose and its thickness lies in the range of approximately 0.01 to 0.03 mm.

Lastly, sheet 6 is also composed of non-woven fabric, but its fibers are synthetic and unaltered by the electrolyte; they are made, for instance, of vinylic material fibers; its thickness is of about 0.1 mm.

The total thickness of the three sheets is thus about 0.3 mm., and, preferably, less than 0.5 mm.

Figure 1A:
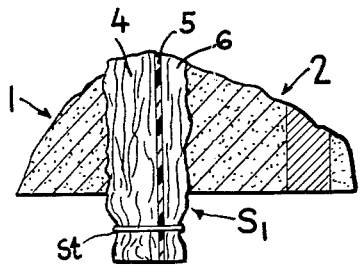
FIGURES 1a and 1b illustrate variants of the separator structure shown in FIGURE 1.
Figure 1B:
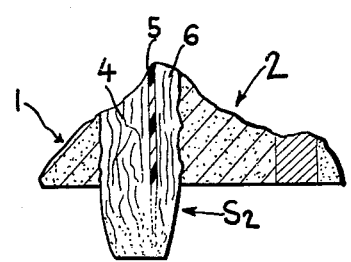

In order to readily position them in their place between electrodes, the three sheets 4, 5 and 6 constituting the separator $S_1$ (FIG. 1a) may be sewn together as at $St$ along their edges which protrude beyond the edges of the electrode plates 1 and 2. They may be united in such protruding edges in other ways as by adhesive, or by heat fusion or welding as illustrated in the separator $S_2$ (FIG. 1b).

Figure 4:
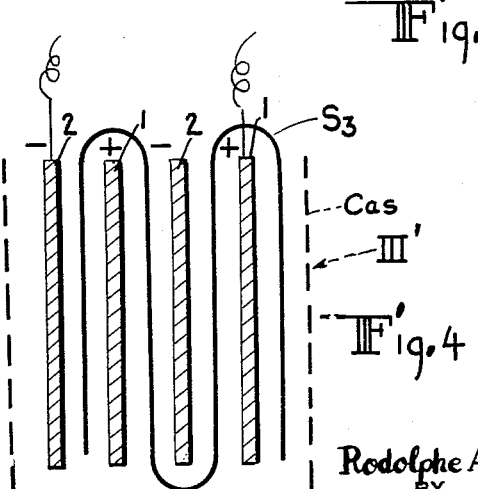
FIGURE 4 illustrates diagrammatically a further variant of separator arrangement in a battery embodying the invention.

The same sheet $S_3$ of great size may constitute separators for several successive plates 1 and 2 of alternating polarities, by folding it accordionwise so that it crosses over the plates from one space between two plates to the following space as seen in FIGURE 4.

When the piling up of plates and separators has been made in the dry state, this pile is introduced in a tightly fitting casing $Cas$ by slight forcing and it is impregnated, preferably under vacuum, with electrolyte, e.g. a potassium hydroxide solution at 28° Bé. (d.=1.35), so that the cellulosic parts of the separators swell and the outer sides of the said separators closely engage the faces of the opposite plates.

The cell is then electrically formed in the usual way.

The curves of FIGURES 2 and 3 illustrate the unusual and surprising functioning of such a cell compared with the functioning of already-known cells, while in operation.

The diagram of FIGURE 2 shows the charging voltage of an alkaline cell as plotted against its charged state represented by the number of amperes-hours of charge already received.

Let us consider three alkaline cells I, II and III having the same theoretical capacity C and realized, the first I according to the conventional technique, i.e. with a space between the plates of about 1 mm. thick and separators made of a porous insulating material not in contact with the plates, the second II according to the technique specified in the Jeannin U.S. Patent 2,646,455 (French Patent No. 1,029,709) or in the U.S. application Ser. No. 653,314 to Jacquier (French patent application filed on May 5, 1956), i.e. a cell without apparent gaseous evolution, and lastly the third III according to the present invention.

The first or conventional alkaline cell operates according to the curve $Ia$, that is to say that its terminal voltage increases rather regularly from the beginning of the charging cycle until about the end, growing from 1.10 v. to 1.60 v. then, in the overcharged state, i.e. beyond the rated capacity C, the voltage increases more quickly until about 1.75 v. or 1.80 v. The curve, therefore, does not show the sharp knee which characterizes, for instance, the end of the charge in lead-acid cells and which is used for the regulation of the charge of the said lead-acid cells. Moreover, at about the first third of the charge, the voltage is more than 1.5 v. and a gaseous evolution appears, which evolution uselessly consumes electrolyte.

In the case of cells without gaseous evolution such as Jeannin and Jacquier cells (curve $IIa$), the curve rises very little; it always remains decidedly under 1.5 v. (about 1.42 volt), but before reaching the rated capacity (about 85 or 90% of the latter), this curve not only does not rise but tends to fall (more or less, according to the charging rate), since on the one hand no gas polarizes the electrodes and, on the other hand, the heating of the electrolyte lowers the internal resistance due to the said electrolyte.

With the cells III according to the present invention, the curve $IIIa$ is seen to present first a flat part like that of curve $IIa$, although of a slightly higher level, but which always remains under the critical voltage of gaseous evolution; then at about the rated capacity, for the usual charging rates, the voltage rises sharply, whereas gases make their appearance.

These results are confirmed by the diagram of FIGURE 3 which shows the amperes-hours AhD which the cell may give up in discharge as plotted against the amperes-hours which it has been given in the charge AhC. The straight line OR which has a slope of 45° corresponds, of course, to an efficiency of 100%, i.e. when the discharged amperes-hours are equal to the charged amperes-hours of the cell.

The first cell (conventional cell) gives curve $Ib$ which tends to deviate from the efficiency 100% as soon as the charged amperes-hours reach about a third of the capacity. This curve $Ib$ shows that the real capacity may be greater than the rated capacity C and that it reaches the value 1.10C (110% of the rated capacity) when the charged amperes-hours are about 150% of the said rated capacity.

The second cell II gives curve IIb which tends to deviate from line OR after 0.90C; this curve is asymptotic to capacity C.

Lastly, the third cell III (curve IIIb) realized according to the present invention tends to deviate from line OR only after 0.90C and reaches quickly the capacity 1.10C.

The study of the curves shown on FIGURES 2 and 3 shows that the behavior of the cells III according to the present invention is substantially the same as that of the cells II without gaseous evolution (e.g. Jacquier and Jeannin cells), from the beginning of the charge until towards the end of the said charge, whereas their behavior resembles that of conventional alkaline cells at the end of the charge and during the overcharge.

The charging efficiency being substantially 100% for the cells III according to the invention as well as for the cells without gaseous evolution, it must be admitted that none of the electrochemical decomposition products leaves the plates and that during the charge the said products (oxygen and hydrogen) are wholly fixed by the active material. The fact that the oxygen and hydrogen are kept back is explained by the close engagement of the separator and the plates which prevents these products from progressing in the space between the plates and the separator. In this way, even if the reactions fixing the oxygen and hydrogen take a longer time than the reaching of the plates by the ions during charging, and more especially at the end of the charge, the gaseous evolution is prevented by the fact that the electrolysis products are imprisoned in contact with the plates.

When the charge is over, i.e. when the active material can no more fix hydrogen and oxygen, these products, prevented from escaping between the plates and separator by the close engagement between the said plates and separator diffuse towards the inner part of the separator. When the separator is homogeneous, that is to say in the case of accumulators without gaseous evolution, the diffusion may take place through the small section of the separator, so that the oxygen (and eventually the hydrogen) evolved on a plate may reach the plate of opposite polarity through the separator.

On the contrary, in the case of the present invention, since the diffusion encounters a much greater resistance in the middle-layer 5 of the separator S, $S_1$, $S_2$ or $S_3$ than in the parts of the separator situated on both sides of the said middle layer, the oxygen (and eventually the hydrogen) preferably progresses parallelly to the plates in the outer, more permeable layers 4 and 6 of the separators, and in this way reaches the outside.

In the case of cells without gaseous evolution, the diffusion takes place at the end of the charge, when, due to the nearly completed charge of the active material, the fixation of the electrolysis products slows down so much that it takes a longer time than the possible speed of diffusion. Thus is explained the fact that the charge of such cell can only reach the rated capacity asymptotically.

On the contrary, in the cell III according to the invention, due to the heterogeneity of the separator, S, $S_1$, $S_2$ or $S_3$ the electrolysis products remain in the vicinity of the plates 1 and 2, so that it is possible, not only to reach the rated capacity, but to overreach it somewhat, the capacity supplement being obtained by the temporary fixation on the plates of the electrolysis products (hydrogen and oxygen) by physical means (adsorption).

The curves Ib, IIb, IIIb, shown in FIGURE 3, are drawn or derived from data taken after a small number of charge and discharge cycles of the respective cells. If several dozens of charges and discharges are accomplished, the curves obtained respectively for a cell without gaseous evolution or for a cell III according to the invention are not very different from those which bear the references IIb and IIIb. On the contrary, a conventional cell alkaline made with the same plates as those yielding the curve Ib then gives the curve I'b, that is to say that it has lost a great part of its rated capacity whereas the two others (curves IIb and IIIb) have retained it. The fact that the latter retain their capacity notwithstanding the time of use is also an important advantage of the cells comprising thin plates having a microporous surface, standing very near each other and with separators closely engaging their faces.

It is well understood that variations may be effected in the described embodiments, especially by substituting equivalent technical means, without departing from the scope and spirit of the present invention.

What is claimed is:

1. In an alkaline storage cell including alkaline electrolyte and finely porous positive and negative electrode plates comprising a support for agglomerated metal particles and impregnated respectively with positive and negative active materials, a thin separator positioned between the electrode plates, said separator being composed of a continuous membranic middle layer of regenerated cellulose having a thickness of approximately 0.01 to 0.03 mm., an outer layer on one side of the middle layer composed of long non-woven cellulosic fibers agglomerated by a cellulosic binder and having a thickness of approximately 0.15 to 0.20 mm., a second outer layer on the other side of the middle layer composed of long unwoven fibers of synthetic material unalterable by the electrolyte and having a thickness of about 0.1 mm., each of said layers having a surface area at least as large as that of the electrode plates and the outer faces of said separator closely engaging the respective adjoining faces of said electrode plates.

2. In an alkaline storage cell according to claim 1, said middle layer and said outer layers being united along their peripheral edges.

3. In an alkaline storage cell according to claim 1, said first-named outer layer of long non-woven cellulosic fibers having its outer face closely engaging the adjoining face of the positive electrode plate, and said second outer layer of long non-woven fibers of synthetic material closely engaging the adjoining face of the negative electrode plate.

4. A thin separator for use in an alkaline storage cell composed of a continuous membranic middle layer of regenerated cellulose having a thickness of approximately 0.01 to 0.03 mm., an outer layer on one side of the middle layer composed of long non-woven cellulosic fibers agglomerated by a binder and having a thickness of approximately 0.15 to 0.20 mm. and a second outer layer on the other side of the middle layer composed of long, unwoven fibers of synthetic material unalterable by alkaline electrolyte and having a thickness of about 0.1 mm.

5. A thin separator according to claim 4 wherein the total thickness of the layers lies between 0.26 and 0.5 mm.

6. A thin separator according to claim 4 wherein said layers are all united together along their peripheral edges.

References Cited in the file of this patent

UNITED STATES PATENTS

| | | |
|---|---|---|
| 2,247,091 | Jumau | June 24, 1941 |
| 2,607,810 | Walker | Aug. 19, 1952 |
| 2,635,127 | Yardney et al. | Apr. 14, 1953 |
| 2,646,455 | Jeannin | July 21, 1953 |
| 2,647,157 | Booth | July 28, 1953 |
| 2,667,527 | Pucher | Jan. 26, 1954 |
| 2,724,733 | Hagspihl et al. | Nov. 22, 1955 |
| 2,851,509 | Di Pasquale et al. | Sept. 9, 1958 |
| 2,890,261 | Andre | June 9, 1959 |

FOREIGN PATENTS

| | | |
|---|---|---|
| 347,012 | Great Britain | Apr. 23, 1931 |